United States Patent [19]
Sullins

[11] Patent Number: 5,493,807
[45] Date of Patent: Feb. 27, 1996

[54] LINE SHOOTER

[76] Inventor: Richard G. Sullins, 602 First St., Terrell, Tex. 75160

[21] Appl. No.: 240,173

[22] Filed: May 9, 1994

[51] Int. Cl.[6] ............................................. A01K 91/02
[52] U.S. Cl. ........................................................ 43/19
[58] Field of Search ................................ 43/19, 25, 21.2; 124/20.1, 80; 242/223

[56] References Cited

U.S. PATENT DOCUMENTS

| | | | |
|---|---|---|---|
| 1,376,260 | 4/1921 | Davis | 43/19 |
| 2,345,043 | 3/1944 | Hall | 43/19 |
| 2,808,043 | 10/1957 | Lombard | 43/19 |
| 2,823,483 | 2/1958 | Malott | 43/19 |
| 2,948,078 | 9/1960 | Miotke | 43/19 |
| 3,030,046 | 4/1962 | Markoff-Moghadam | 43/25 |
| 3,292,295 | 12/1966 | Saltness | 43/19 |
| 3,683,882 | 8/1972 | Braxton | 43/19 |
| 4,014,126 | 3/1977 | Samuels | 43/19 |
| 4,127,956 | 12/1978 | Hertkorn | 43/19 |
| 4,250,861 | 2/1981 | Ellenburg | 124/20.1 |
| 4,587,943 | 5/1986 | Ross | 43/19 |
| 5,230,323 | 7/1993 | Saunders | 124/20.1 |

*Primary Examiner*—Kurt Rowan

[57] ABSTRACT

A line shooter including a spool of light line freely releasing and susceptible of recovery using manual or powered mechanisms and furthermore having a soft weighted mass attached to a free end thereof, a handle and brace enabling holding in one hand, and a U-shaped arm member having an elastic sling affixed to the free ends thereof. In practice the weighted mass is launched into the region the line is intended to be thrown by using the elastic sling. Retrieval of the mass and line is accomplished by the manual or powered recovery system.

1 Claim, 4 Drawing Sheets

PRIOR ART

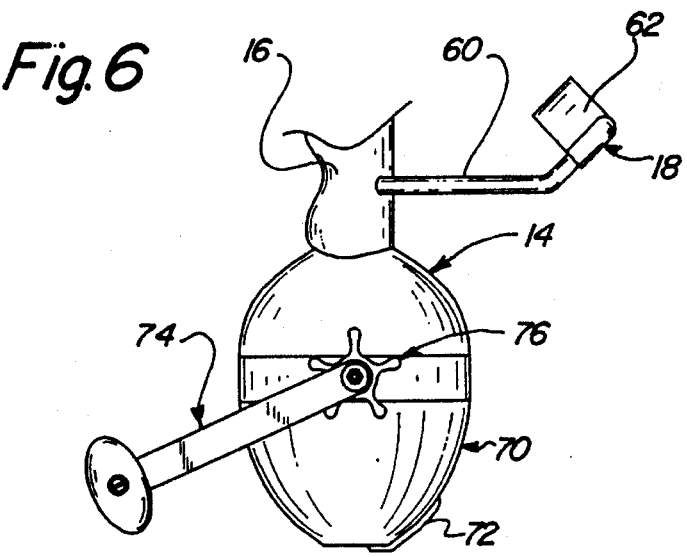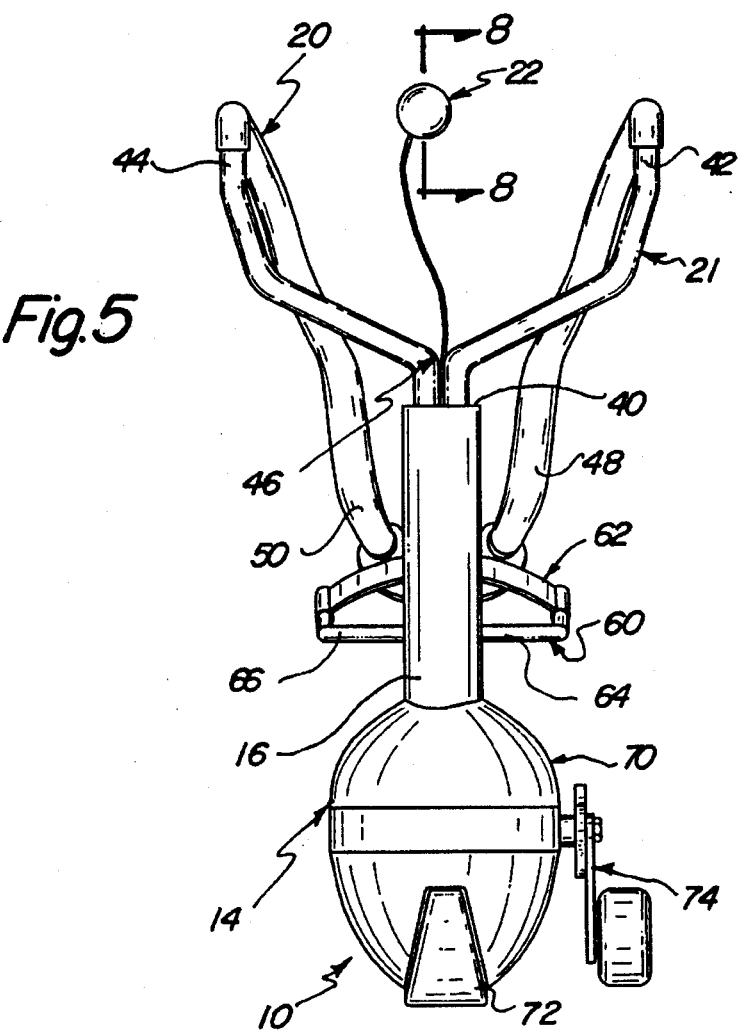

LINE SHOOTER

BACKGROUND OF THE INVENTION

1. Field of the Invention

The present invention relates to small diameter line throwing devices and more particularly pertains to a line shooter which may be employed to launch a continuous line from one location to a second location wherein the second location is substantially inaccessible by ordinary means.

2. Description of the Prior Art

The use of line shooters is known in the prior art. More specifically, line shooters heretofore devised and utilized launching light lines from one location to another are known to consist basically of familiar, expected and obvious structural configurations, notwithstanding the myriad of designs encompassed by the crowded prior art which have been developed for the fulfillment of countless objectives and requirements.

The present invention is directed to improving devices for a line shooter in a manner which is safe, secure, economical and aesthetically pleasing.

For example U.S. Pat. No. 3,742,637 to Badovinac discloses a fishing slingshot comprising a device for launching an elongated arrow with various fishhooks, lures, and a line attached wherein the slingshot apparatus and arrow are affixed to an existing fishing rod and reel. The present invention is not intended for use by fishermen and furthermore comprises a slingshot and a line feeding fishing style reel which is employed to launch a light line affixed to a weighted soft projectile.

In U.S. Pat. No. 4,014,126 to Samuels et al. a slingshot-action fishing rod is disclosed wherein a pivoting arm pair having a sling affixed thereon is clampedly disposed upon an existing fishing rod with reel for the purpose of launching a fishook, line, and attachments thereto. The present invention is not designed for fishing purposes and furthermore the present invention has no rod portion and is not devised to affix to an existing apparatus including fishing rods and reels.

In U.S. Des. Pat. No. 297,041 to Bongiorni the ornamental design for a slingshot is described. The Bongiorni invention comprises a handheld, forearm braced frame having a tubular structure and an elastic sling disposed thereon. The Bongiorni invention is suitable only for launching elongated projectiles such as darts or arrows wherein a portion of the projectile is maintained within the tubular structure throughout all phases of launching. The present invention does not employ darts or arrowlike projectiles because there are frequent occasions when bodily harm or other damage may result should the projectile strike a human or other object. The present invention employs a soft projectile which has sufficient mass to be launched considerable distances at high velocity with little danger of incurring damage.

In U.S. Des. Pat. No. 258,136 to Magoon the ornamental design of a slingshot is disclosed. A disadvantage in this prior art lies in a lack of provision for affixing the slingshot to a reel member.

In this respect, the line shooter according to the present invention substantially departs from the conventional concepts and designs of the prior art, and in so doing provides an apparatus primarily developed for the purpose of launching and recovering a light line into substantially inaccessible regions.

Therefore, it can be appreciated that there exists a continuing need for new and improved line shooter which can be employed to launch a light line to a substantially inaccessible region such as a rooftop, an attic, or a crawl space. In this regard, the present invention substantially fulfills this need.

As illustrated by the background art, efforts are continuously being made in an attempt to improve line launching devices. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of line launchers now present in the prior art, the present invention provides an improved line shooter construction wherein the same can be utilized for launching a light line to substantially inaccessible regions. As such, the general purpose of the present invention, which will be described subsequently in greater detail, is to provide a new and improved line shooter apparatus and method which has all the advantages of the prior art line launching devices and none of the disadvantages.

The invention is defined by the appended claims with the specific embodiment shown in the attached drawings. For the purpose of summarizing the invention, the invention may be incorporated into a spool holding light line such as monofilament fishing line affixed to a short handle and an armbrace wherein the handle terminates in a U-shaped member having an elastic member affixed to the free ends thereof. The light line has attached at a free end thereof a weighted projectile composed of heavy, soft material such as a lead core surrounded by polyurethane foam. The spool has provision for substantially unimpeded release of line as the projectile travels to a target and furthermore the spool has provision for retrieving the projectile by windingly replacing the line within a spool body.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide an improved line shooter useable for launching light lines to substantially inaccessible regions.

It is therefore an additional object of the present invention to provide a new and improved line shooter which has all the advantages of the prior art line launchers and none of the disadvantages.

It is another object of the present invention to provide a new and improved line shooter which may be easily and efficiently manufactured and marketed.

It is a further object of the present invention to provide a new and improved line shooter which is of a durable and reliable construction.

An even further object of the present invention is to provide a new and improved line shooter which is susceptible of a low cost of manufacture with regard to both materials and labor, and which accordingly is then susceptible of low prices of sale to the consuming public, thereby making such line shooters economically available to the buying public.

Still yet another object of the present invention is to provide a new and improved line shooter which provides in the apparatuses and methods of the prior art some of the advantages thereof, while simultaneously overcoming some of the disadvantages normally associated therewith.

Still another object of the present invention is to provide a new and improved line shooter which is lightweight and sufficiently portable to be of use to electricians, plumbers, and boatmen.

Yet another object of the present invention is to provide a new and improved line shooter which can be repeatedly used without damage in most working environments.

Even still another object of the present invention is to provide a new and improved line shooter which is easily aimed and capable of throwing a line a greater distance than generally feasible by other throwing techniques.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a side elevational view of the line shooter.

FIG. 6 is a fragmentary side elevational view of the line shooter showing an exterior line recovery lever.

FIG. 5 is a side elevational view of the line shooter.

DESCRIPTION OF THE PREFERRED EMBODIMENT

Figure 1:
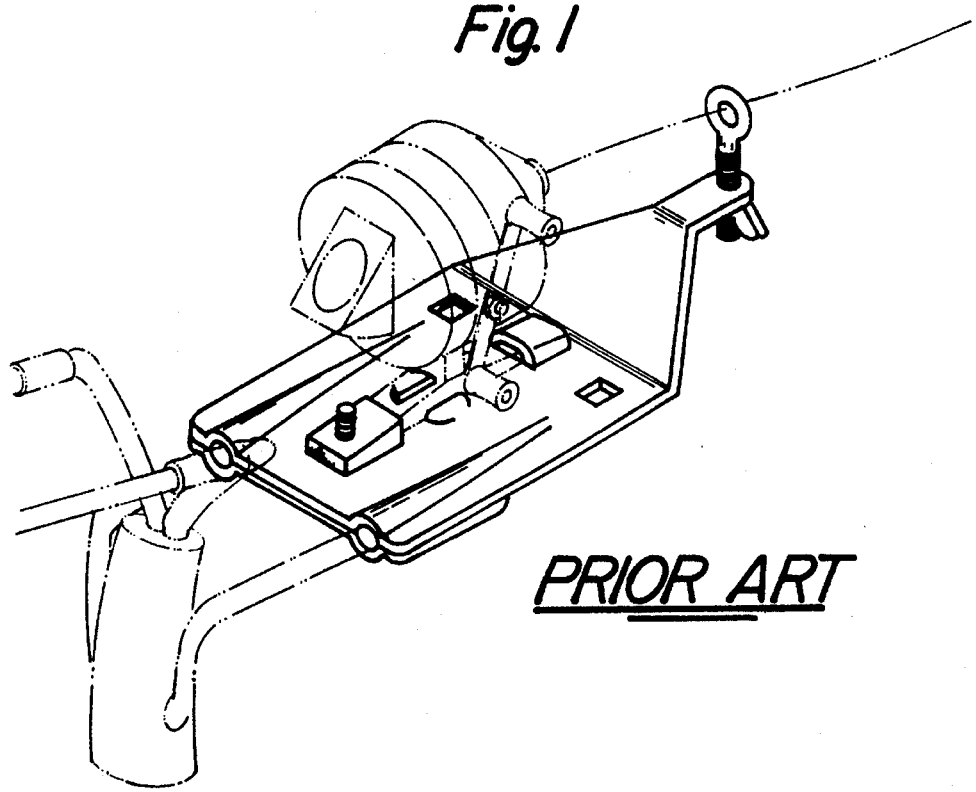
FIG. 1 is prior art.
Figure 2:
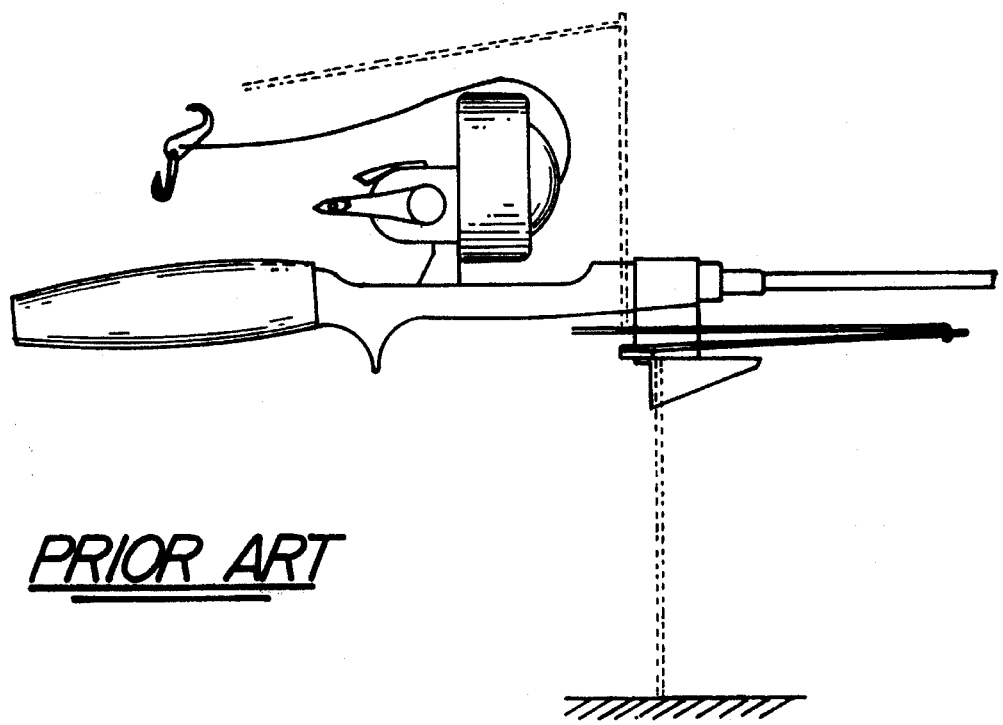
FIG. 2 is prior art.
Figure 3:
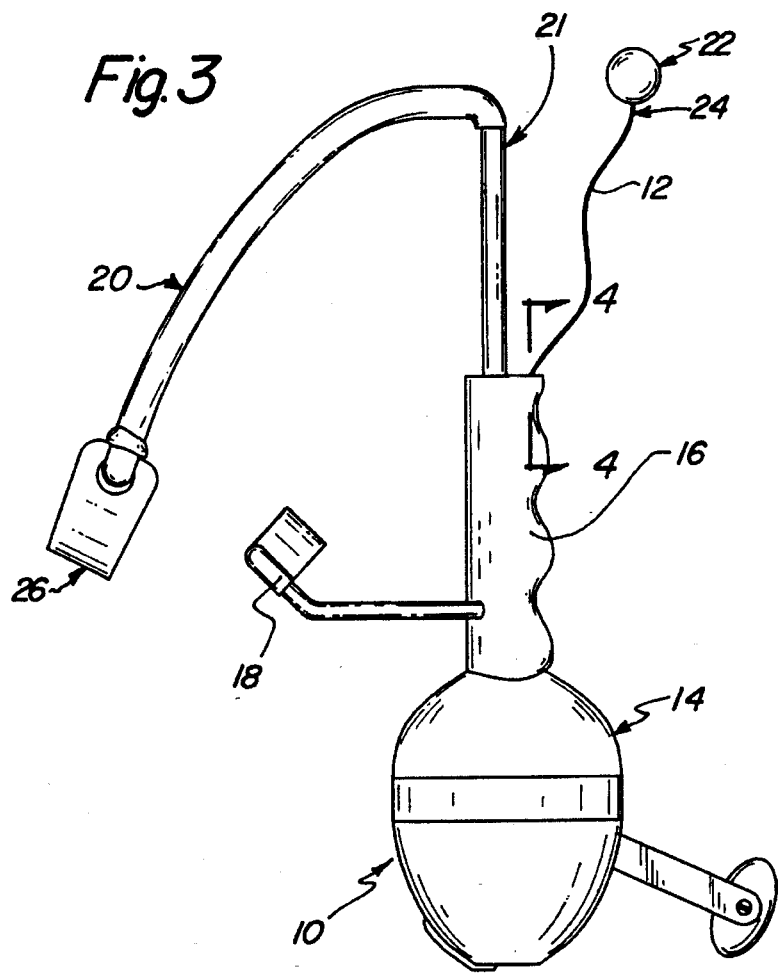
FIG. 3 is a side elevational view of the line shooter showing the major components thereof

With reference now to the drawings, and in particular to FIG. 3 thereof, a new and improved line shooter embodying the principles and concepts of the present invention and generally designated by the reference numeral 10 will be described.

From an overview standpoint, the line shooter 10 is adapted for use with lightweight line 12 such as monofilament fishing line to launch said line from one point to a more distant point thereby producing linkage therebetween. See FIG. 3. The line shooter 10 comprises a reel member 14, a handle 16 having a brace 18 affixed thereon, an elastic sling 20, a U-shaped arm member 21, and a soft weighted projectile 22 affixed to a free end 24 of the line 12. Elastic sling 20 has a small flexible inelastic pouch 26 centrally disposed thereon for receiving projectile 22. In use, handle 16 is grasped with one hand permitting a portion of brace 18 to rest upon an associated forearm. Projectile 22 is placed in pouch 26 and grasped with fingers of a free hand whereafter sling 20 is forcibly extended and released thereby imparting motion to projectile 22 and attached line 12. Reel member 14 has provision for free release of line 12 therefrom and a recovery system for retrieving the line 12.

Figure 4:
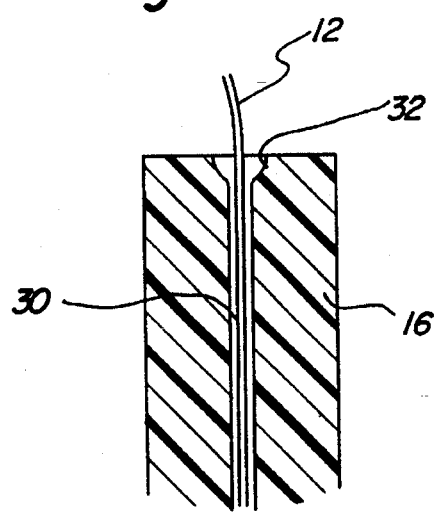
FIG. 4 is a side sectional view of the line shooter taken substantially upon the section line 4—4 of FIG. 3.

More specifically, it will be noted that the line shooter 10 comprises a light line 12 capable of being thrown by sling 20 and recovered by reel member 14. Light line 12 comprises an elongated filament of nylon® composition or other flexible, stringlike material including singular or plural woven fibers of natural or synthetic composition. Light line 12 passes through hole 30 penetrating the length of handle 16 and permitting loose engagement therewith. A free end of hole 30 is terminated with a curving portion 32 which presents no sharp corner abutting line 12 which, being pulled from handle 16 with considerable force substantially orthogonally directed with respect to the axis of handle 16, is susceptible to breakage and frictional wear, and furthermore the maximum range of the line shooter 10 may be limited by excessive friction within hole 30 and curving portion 32. See FIG. 4. Hole 30 may be lined with a low friction material such as teflon® which has a low friction coefficient and there is substantially no difference between the coefficients of static and kinetic friction therefore energy loss by stick slip effects is nonexistent.

The entirety of handle member 16 may comprise low friction material or be of plastic, polymeric, or wooden construction, and furthermore handle member 16 amy comprise a multilayer construction having a hard inner core portion surrounded by a soft material for hand engagement. Handle member 16 is fabricated to easily fit a wide range of hand sizes and may have various shapes, knurlings, or decorative markings disposed thereupon. Handle member 16 furthermore has a provision for mounting U-shaped arm member 21 thereupon. U-shaped arm member 21 is generally formed as a singular piece to provided the requisite stiffness for resisting forces applied during elongation of the sling 20. Handle member 16 may comprise a molded piece encapsulating a central portion of U-shaped member 21 extending through a substantial portion of the length thereof, or a slot 40 may be formed through the length of handle member 16 and U-shaped member 21 is inserted therein and adhesively affixed in place. See FIG. 5.

U-shaped member 21 comprises a rigid tubular or solid material formed to have an opening between a first leg portion 42 and a second leg portion 44 permitting free passage of projectile 22 and line 12 therethrough. A central portion 46 of U-shaped member 21 is folded upon itself to form an elongated rigid attachment engaging slot 40 of handle member 16 over a substantial portion thereof, or, if handle member 16 is a molded part central portion 46 is substantially embedded therein. First leg portion 44 and second leg portion 46 lie substantially in a plane containing central portion 46, however deviations placing first leg portion 42 and second leg portion 44 in a plane somewhat removed from a plane containing central portion 46 also comprise feasible embodiments thereof.

Sling 20 comprises an elastic material such as surgical tubing or various rubbers and may be tubular or ribbonlike in shape. Sling 20 may comprise a first member 48 and a second member 50 each joining pouch 26 at one free end and U-shaped member 21 at another free end thereby forming a continuous loop extending from first leg portion 42 to second leg portion 44. Various methods of attachment of first member 48 to first leg portion 42 and second member 50 to second leg portion 44 are feasible including a technique employed for surgical tubing involving slidably engaging the surgical tubing over an end of a respective leg portion thereof. As force is applied to sling 20 in use the surgical tubing stretches thereby experiencing a diameter reduction throughout. Over the portion of engagement with a leg portion the tubing cannot experience a diameter reduction therefore a substantial increase in force applied normal to the interface of the tubing and the leg portion is resultant. This increased force proportionally increases the frictional holding force thereby maintaining the tubing in place nearly independently of the amount of stretch applied thereon. First leg portion 42 and second leg portion 44 may have surface irregularities disposed thereon to enhance the holding effect and, if desired, an adhesive or an external binding may be applied to preclude slippage likely to occur should oils or moisture appear at a tubing and leg portion interface.

Pouch 26 comprises an elongated flexible inelastic material such as leather having a hole or slit disposed near each free end thereof. The holes or slits in pouch 26 are employed to affix sling 20 thereto and furthermore sling 20 may be affixed thereon using a knot, loop, or binding to provide a permanent joint therebetween.

Brace 18 comprises a rigid structure 60 having a band 62 affixed thereon. Rigid structure 60 is affixed to handle member 16 by being embedded during molding, or by adhesive bonding, or by threaded fastening means. See FIG. 6. Rigid structure 60 is bifurcated forming a first element 64 and a second element 66 wherein said first element 64 and said second element 66 are separated by a short distance. Band 62 may comprise a flexible straplike material, or may comprise a rigid ribbon, or may be an extension of structure 60 so formed as to substantially conform to a portion of the curving periphery of a user's forearm. Rigid structure 60 is generally disposed orthogonally to the handle member 16 and is formed in a manner which permits a true vertical orientation of the handle member 16 when the user's forearm is aligned with a true horizontal whenever the handle member is gripped by the hand of the user and band 62 is rested upon the user's forearm.

Figure 7:
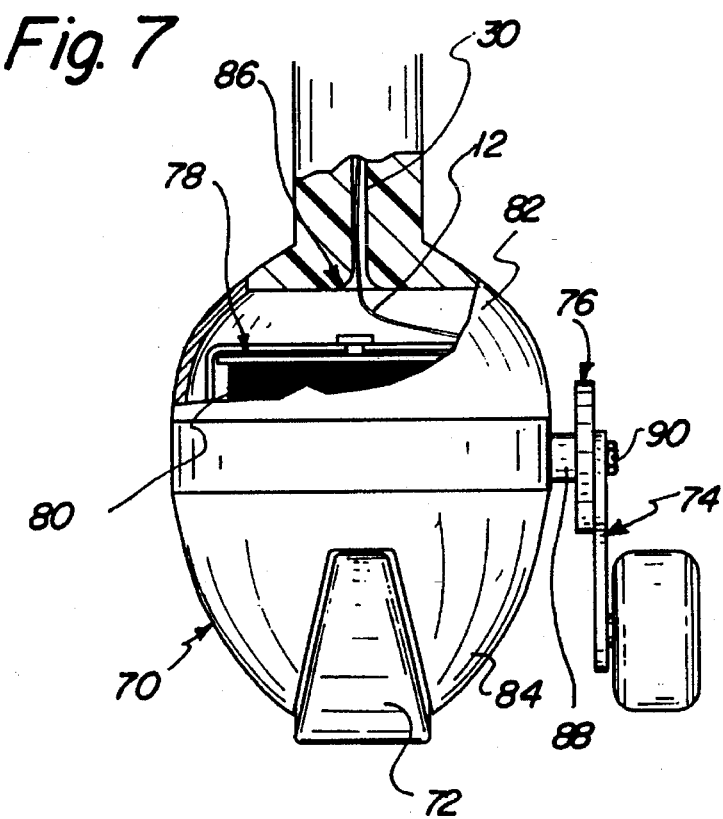
FIG. 7 is a fragmentary side sectional cutaway view of a line shooter showing selected interior components.
Figure 8:
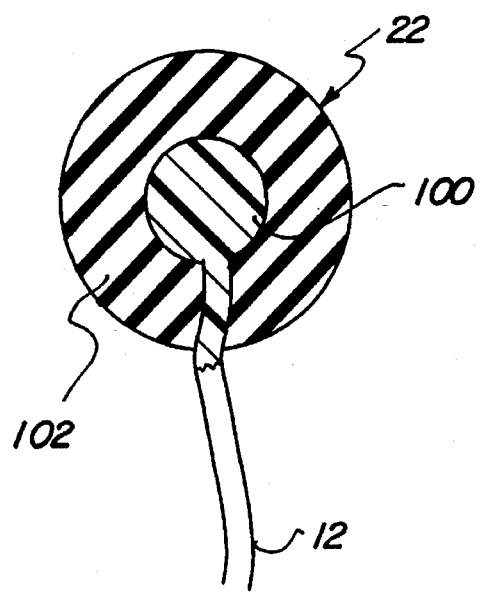
FIG. 8 is a fragmentary side sectional view of a line shooter taken substantially upon the section line 7—7 of FIG. 6 showing the internal construction of a soft projectile.

Reel member 14 comprises a housing 70, a spool 80, a line release device 72, a hand crank 74, a line trap device 78, and a line tensioning device 76. See FIG. 7. Housing 70 comprises a shellike structure having a first portion 82 and a second portion 84 wherein said first portion 82 threadedly engages said second portion 84 thereby providing a means for replacing or repairing line 12 by separating reel member 14 into two parts. First portion 82 may be formed as an extension of handle member 16 or otherwise be affixed to handle member 16 using threaded engagement or adhesives. A long length of line 12 is initially wound upon spool 80 during assembly of the line shooter 10 and a free end thereof is passed through hole 30 and is subsequently affixed to projectile 22. End 86 of hole 30 has curving edges to protect line passing therethrough. Line release device 72 comprises a lever actuated by thumb pressure which disengages line trap device 78 thereby permitting free extraction of line during launch of the projectile 22. Hand crank 74 is connected through frictional engagement and a system of engaging gears to line release device 72 and line trap 78 wherein rotation of hand crank 74 produces disengagement of line release device 72 and rotation of line trap device 78. Upon disengagement of line release device 72 the line trap device 78 engages the line and through rotation and translation over the width of the spool 80 line is replaced upon the spool 80 and projectile 22 is retrieved. Frequently a larger item or line will be attached to line 12 and recovery of projectile 22 will provide recovery of the attached item or line. To prevent snag induced line breakage during recovery a line tensioning device 76 is provided. Line tensioning device 76 provides a selection of a maximum line tension without releasing addition line to relieve excess tension through rotation of line trap device 78. Line tensioning device 76 comprises a frictionally engaging clutch made adjustable by rotation thereof which generates variable force between hand crank 74 and a driving portion 88 of shaft 90. Line tensioning device 76 is conveniently spur shaped to enable rotation using the operator's fingers.

Soft projectile 22 comprises a centrally disposed heavy core 100 having line 12 affixed thereto. Heavy core 100 comprises a material such as lead or hard rubber which is employed to maximize the range of the line shooter 10. A soft cover 102 comprises a material such as foam rubber or foam polyurethane which mitigates any deleterious effect of striking a person or valuable object during use.

In an alternate embodiment, the line shooter 10 has a powered line retrieval device disposed therein. The powered line retrieval device may employ one or more electrical cells and a small electrical motor with a switch member to complete or open a series interconnection thereof. The electrical motor is interconnected through a series of gears to the line trap 78 and is employed to provide rotation thereto in a manner similar to rotation produced by manual crank 74. A manual or electrical solenoid operated line release device may be employed in conjunction with the powered line retrieval device.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

What is claimed as being new and desired to be protected by LETTERS PATENT of the United States is as follows:

1. A new and improved line shooter for launching a light line to a more distant location comprising:

a long length of light line having a weighted projectile affixed to a free end thereof and furthermore said light line is wound upon a spool member;

a means for freely releasing and recovering said light line from said spool member;

an elastic sling which, in operational disposition, propels the projectile from a launch site to a remote target side thereby disposing the attached light line therebetween;

a U-shaped sling attachment member having a free end of the elastic sling attached to a free end of the U-shaped sling attachment member thereby disposing the sling therebetween;

a handle means gripped by the user and furthermore having affixed thereon the spool member, the U-shaped sling attachment member and a brace member engaging the forearm of the user; and an elongated tubular structure having a through hole disposed therein for free passage of said light line, a rigid engagement means for affixing the U-shaped sling attachment member thereto, and a rigid engagement means for affixing a forearm engaging brace thereto.

* * * * *